United States Patent
Dabak et al.

(10) Patent No.: US 7,634,019 B2
(45) Date of Patent: *Dec. 15, 2009

(54) BEAM FORMING FOR TRANSMIT USING BLUETOOTH MODIFIED HOPPING SEQUENCES (BFTBMH)

(75) Inventors: Anand G. Dabak, Plano, TX (US); Mohammed Nafie, Richardson, TX (US); Timothy M. Schmidl, Dallas, TX (US); Alan Gatherer, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/466,270

(22) Filed: Aug. 22, 2006

(65) Prior Publication Data

US 2006/0280143 A1 Dec. 14, 2006

Related U.S. Application Data

(63) Continuation of application No. 09/489,668, filed on Jan. 24, 2000, now Pat. No. 7,164,704.

(60) Provisional application No. 60/169,747, filed on Dec. 9, 1999.

(51) Int. Cl.
*H04L 1/02* (2006.01)
*H04B 1/38* (2006.01)
*H04B 1/00* (2006.01)

(52) U.S. Cl. .................. 375/267; 375/132; 375/219

(58) Field of Classification Search ................. 375/132, 375/133, 134, 135, 137, 219, 259–260, 267, 375/299, 347; 340/572.1; 455/73–101; 370/278, 370/282, 330, 436, 478

See application file for complete search history.

(56) References Cited

U.S. PATENT DOCUMENTS

| 5,307,371 A | 4/1994 | Juola |
| 5,327,143 A | 7/1994 | Goetz et al. |
| 5,402,451 A | 3/1995 | Kaewell, Jr. et al. |

(Continued)

OTHER PUBLICATIONS

Acampora et al., System Application for Wireless Indoor Communications, Aug. 1987, IEEE Communications Magazine, vol. 25, Issue 8, pp. 11-20.*

(Continued)

*Primary Examiner*—Tesfaldet Bocure
*Assistant Examiner*—Lawrence B Williams
(74) *Attorney, Agent, or Firm*—Ronald O. Neerings; Wade James Brady, III; Frederick J. Telecky, Jr.

(57) ABSTRACT

A communication circuit (28) is designed with a signal processing circuit (370) arranged to produce a first plurality of data signals and receive a second plurality of data signals. A transmit circuit (364) is coupled to receive the first plurality of data signals and transmit each data signal of the first plurality of data signals on a respective transmit frequency in a predetermined sequence of transmit frequencies. A receive circuit (362) is coupled to receive each data signal of the second plurality of data signals from a remote transmitter on the respective transmit frequency in the predetermined sequence. The receive circuit applies the second plurality of data signals to the signal processing circuit.

24 Claims, 13 Drawing Sheets

U.S. PATENT DOCUMENTS

| | | | |
|---|---|---|---|
| 5,428,602 A | 6/1995 | Kemppainen | |
| 5,446,922 A | 8/1995 | Siwiak et al. | |
| 5,483,557 A | 1/1996 | Webb | |
| 5,781,845 A | 7/1998 | Dybdal et al. | |
| 5,828,658 A | 10/1998 | Ottersten et al. | |
| 5,943,362 A | 8/1999 | Saito | |
| 6,061,023 A | 5/2000 | Daniel et al. | |
| 6,067,324 A | 5/2000 | Harrison | |
| 6,240,126 B1* | 5/2001 | Ohashi et al. | 375/132 |
| 6,359,923 B1 | 3/2002 | Agee et al. | |
| 6,400,780 B1 | 6/2002 | Rashid-Farrokhi et al. | |
| 6,421,543 B1 | 7/2002 | Molnar | |
| 6,519,236 B1* | 2/2003 | Haartsen et al. | 370/332 |
| 6,519,460 B1 | 2/2003 | Haartsen | |
| 6,574,266 B1* | 6/2003 | Haartsen | 375/133 |
| 6,584,161 B2* | 6/2003 | Hottinen et al. | 375/299 |
| 6,584,302 B1 | 6/2003 | Hottinen et al. | |
| 6,590,928 B1* | 7/2003 | Haartsen | 375/134 |
| 6,600,776 B1 | 7/2003 | Alamouti et al. | |
| 6,636,495 B1* | 10/2003 | Tangemann | 370/334 |
| 6,650,871 B1 | 11/2003 | Cannon et al. | |
| 6,678,341 B1 | 1/2004 | Miyake et al. | |
| 6,714,514 B1 | 3/2004 | Espax et al. | |
| 6,717,516 B2 | 4/2004 | Bridgelall | |
| 6,728,517 B2 | 4/2004 | Sugar et al. | |
| 6,731,908 B2* | 5/2004 | Berliner et al. | 455/67.11 |
| 6,859,761 B2* | 2/2005 | Bensky et al. | 702/189 |
| 6,870,874 B2* | 3/2005 | Izumi | 375/132 |
| 6,891,857 B1 | 5/2005 | Nevo et al. | |
| 6,895,253 B1 | 5/2005 | Carloni et al. | |
| 6,898,415 B2* | 5/2005 | Berliner et al. | 455/63.1 |
| 7,164,704 B1* | 1/2007 | Dabak et al. | 375/133 |
| 7,289,826 B1* | 10/2007 | Hovers et al. | 455/562.1 |
| 2002/0000948 A1 | 1/2002 | Chun et al. | |
| 2002/0034263 A1* | 3/2002 | Schmidl et al. | 375/299 |
| 2002/0167914 A1* | 11/2002 | Haneda | 370/255 |
| 2002/0183013 A1 | 12/2002 | Auckland et al. | |
| 2004/0162037 A1 | 8/2004 | Shpak | |
| 2004/0203470 A1* | 10/2004 | Berliner et al. | 455/67.16 |

OTHER PUBLICATIONS

Haartsen et al., Bluetooth-A New Low-Power Radio Interface Providing Short-Range Connectivity, Oct. 10, 2000, IEEE Proceeding of the IEEE, vol. 88, pp. 1651-1661.*

"Baseband Specification — Part B", Bluetooth Specification Version 1.0B, XP-002234481, Nov. 29, 1999, pp. 34-53.

"Bluetooth Radio System Overview", WinHEC 99 White Paper, Windows Hardware Engineering Conference: Advancing the Platform, Apr. 28, 1999, pp. 2-19.

"Bluetooth-The Universal Radio interface for Ad Hoc, Wireless Connectivity", Jaap Haartsen, XP-000783249, Ericsson Review No. 3, pp.110-117, 1998.

"Networks for Homes", Amitava Dufta-Roy, IEEE Spectrum, Communications, Dec. 1999, pp. 26-33.

System Applications for Wireless Indoor Communications, A. S. Acampora, et al., IEEE Communications Magazine, IEEE Service Center, Pscataway, NJ, US, vol. 25, No. 8, Aug. 1987, pp. 11-20, XP000949107, ISSN: 0163-6804.

* cited by examiner

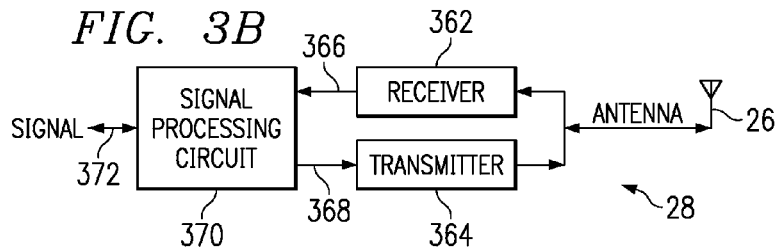
FIG. 3B
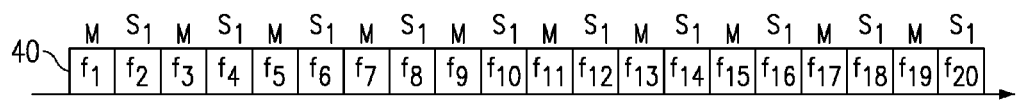
FIG. 4A
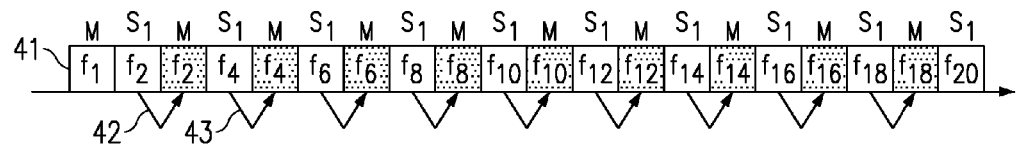
FIG. 4B
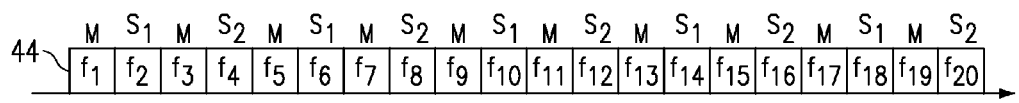
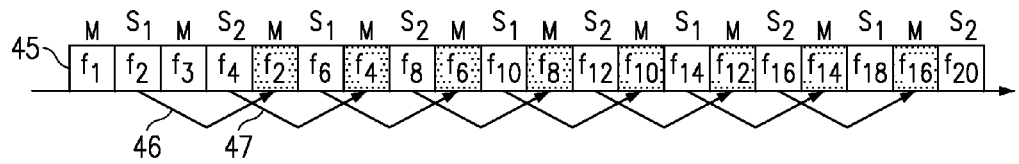
FIG. 6
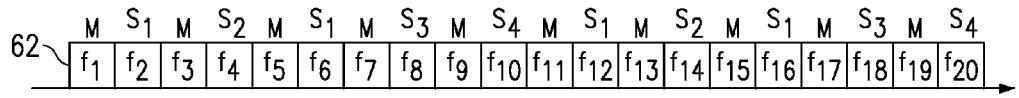
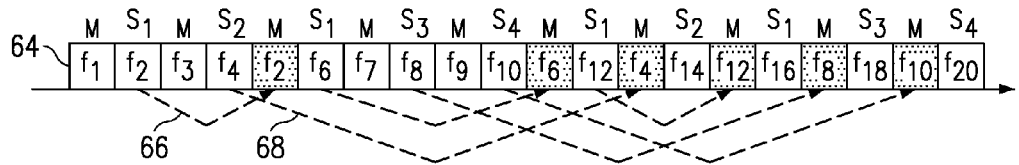

| BFT GAINS OVER SINGLE ANTENNA TRANSMISSION | NORMAL BLUETOOTH HOPPING FREQUENCIES | BLUE MODIFIED HOPPING (BMH) FREQUENCIES |
|---|---|---|
| BFT (TxAA) | | |
| HV3 VOICE, 3 Km/h | 2.2 dB | 11.6 dB |
| HV3 VOICE, 1 Km/h | 4.7 dB | 11.6 dB |
| HV1 VOICE, 3 Km/h | 5.0 dB | 11.6 dB |
| HV1 VOICE, 1 Km/h | 8.3 dB | 11.6 dB |
| BFT (STD) | | |
| HV3 VOICE, 3 Km/h | 1.2 dB | 10 dB |
| HV3 VOICE, 1 Km/h | 3.0 dB | 10 dB |
| HV1 VOICE, 3 Km/h | 3.2 dB | 10 dB |
| HV1 VOICE, 1 Km/h | 6.0 dB | 10 dB |

FIG. 9

| BLUETOOTH DEVICE RANGE | NORMAL BLUETOOTH HOPPING FREQUENCIES | BLUE MODIFIED HOPPING (BMH) FREQUENCIES |
|---|---|---|
| BFT (TxAA) | | |
| HV3 VOICE, 3 Km/h | 1.2 x | 2.4 x |
| HV3 VOICE, 1 Km/h | 1.4 x | 2.4 x |
| HV1 VOICE, 3 Km/h | 1.5 x | 2.4 x |
| HV1 VOICE, 1 Km/h | 1.9 x | 2.4 x |
| BFT (STD) | | |
| HV3 VOICE, 3 Km/h | 1.1 x | 2.2 x |
| HV3 VOICE, 1 Km/h | 1.3 x | 2.2 x |
| HV1 VOICE, 3 Km/h | 1.3 x | 2.2 x |
| HV1 VOICE, 1 Km/h | 1.6 x | 2.2 x |

FIG. 10

| MAXIMUM NUMBER OF PICONETS SUPPORTED IN 10 m X 10 m AREA FOR A GIVEN PACKET ERROR RATE FOR HV3 VOICE, BFT (TxAA) FOR TWO ANTENNA TRANSMISSION | | | | | | | | |
|---|---|---|---|---|---|---|---|---|
| | SINGLE ANTENNA TRANSMISSION | | BLUETOOTH 3 Kmph | | BLUETOOTH 1 Kmph | | BMH | |
| | 1 % | 10 % | 1 % | 10 % | 1 % | 10 % | 1 % | 10 % |
| d=0.5 m | 6 | 60 | 10 | 93 | 17 | 133 | 42 | 240 |
| d=1.0 m | 2 | 18 | 4 | 27 | 6 | 38 | 12 | 65 |
| d=2.0 m | 1 | 6 | 1.3 | 9 | 1.9 | 12 | 3.5 | 19 |
| d=4.0 m | 0.4 | 2 | 0.6 | 3.4 | 0.8 | 4.5 | 1.2 | 6 |
| d=7.0 m | 0.2 | 1.2 | 0.3 | 1.6 | 0.4 | 2.1 | 0.6 | 3 |
| d=10.0 m | 0.1 | 0.8 | 0.2 | 1.1 | 0.3 | 1.3 | 0.4 | 2 |

| MAXIMUM NUMBER OF PICONETS SUPPORTED IN 10 m X 10 m AREA FOR A GIVEN PACKET ERROR RATE FOR HV3 VOICE, BFT (STD) FOR TWO ANTENNA TRANSMISSION | | | | | | | | |
|---|---|---|---|---|---|---|---|---|
| | SINGLE ANTENNA TRANSMISSION | | BLUETOOTH 3 Kmph | | BLUETOOTH 1 Kmph | | BMH | |
| | 1 % | 10 % | 1 % | 10 % | 1 % | 10 % | 1 % | 10 % |
| d=0.5 m | 6 | 60 | 12 | 80 | 12 | 100 | 30 | 170 |
| d=1.0 m | 2 | 18 | 3.9 | 25 | 4.1 | 30 | 8.5 | 47 |
| d=2.0 m | 1 | 6 | 1.3 | 8.2 | 1.4 | 9.7 | 2.5 | 15 |
| d=4.0 m | 0.4 | 2 | 0.6 | 3.2 | 0.6 | 3.6 | 1 | 5.2 |
| d=7.0 m | 0.2 | 1.2 | 0.3 | 1.5 | 0.3 | 1.7 | 0.5 | 2.2 |
| d=10.0 m | 0.1 | 0.8 | 0.2 | 1 | 0.2 | 1.1 | 0.3 | 1.5 |

| NUMBER OF PICONETS SUPPORTED AT LAN AP USING BFT(NULL) FOR TWO ANTENNA TRANSMISSION | SINGLE ANTENNA TRANSMISSION | BLUETOOTH 3 Kmph | BLUETOOTH 1 Kmph | BMH |
|---|---|---|---|---|
| | PACKET ERROR RATE 10 % | PACKET ERROR RATE 10 % | PACKET ERROR RATE 10 % | PACKET ERROR RATE 10 % |
| HV3 VOICE | 9 | 13 | 16 | 43 |
| HV1 VOICE | 9 | 21 | 24 | 43 |

BEAM FORMING FOR TRANSMIT USING BLUETOOTH MODIFIED HOPPING SEQUENCES (BFTBMH)

This application is a Continuation of application Ser. No. 09/489,668, filed Jan. 24, 2000 now U.S. Pat. No. 7,164,704.

CLAIM TO PRIORITY OF PROVISIONAL APPLICATION

This application claims priority under 35 U.S.C. § 119 (e)(1) of provisional application No. 60/169,747, filed Dec. 9, 1999.

FIELD OF THE INVENTION

This invention relates to a wireless communication system and more particularly to a Bluetooth wireless communication system.

BACKGROUND OF THE INVENTION

Present telecommunication systems include many wireless networking systems for both voice and data communication. An overview of several of these wireless networking systems is presented by Amitava Dutta-Roy, *Communications Networks for Homes*, IEEE Spectrum, December 1999 at 26. Therein, Dutta-Roy discusses several communication protocols in the 2.4 GHz band, including IEEE 802.11 direct-sequence (DS) and frequency-hopping (FH) protocols. These protocols, however, were initially developed for cellular telephony. A disadvantage, therefore, of these protocols is the high overhead associated with their implementation. Id. at 31. A less complex wireless protocol known as the Shared Wireless Access Protocol (SWAP) also operates in the 2.4 GHz band. This protocol has been developed by the HomeRF Working Group and is supported by North American communications companies. The SWAP protocol uses frequency-hopping spread-spectrum technology to produce a data rate of 1 Mb/s. Another less complex protocol is named Bluetooth after a $10^{th}$ century Scandinavian king who united several Danish kingdoms. This protocol also operates in the 2.4 GHz band and advantageously offers short-range wireless communication between Bluetooth devices without the need for a central network.

The Bluetooth protocol operates in the 2.4 GHz ISM band and provides a 1 Mb/s data rate with low energy consumption for battery operated devices. The current Bluetooth protocol provides a 10 meter range and an asymmetric data transfer rate of 721 kb/s. The protocol supports a maximum of three voice channels for synchronous, CVSD-encoded transmission at 64 kb/s. The Bluetooth protocol treats all radios as peer units except for a unique 48-bit address. At the start of any connection, the initiating unit is a temporary master. This temporary assignment, however, may change after initial communications are established. Each master may have active connections of up to seven slaves. Such a connection between a master and one or more slaves forms a piconet. Link management allows communication between piconets, thereby forming scatternets. Typical Bluetooth master devices include cordless phone base stations, local area network (LAN) access points, laptop computers, or bridges to other networks. Bluetooth slave devices may include cordless handsets, cell phones, headsets, personal digital assistants, digital cameras, or computer peripherals such as printers, scanners, fax machines and other devices.

The Bluetooth protocol uses time-division duplex (TDD) to support bi-directional communication. Spread-spectrum technology or frequency diversity with frequency hopping permits operation in noisy environments and permits multiple piconets to exist in close proximity. The frequency hopping scheme permits up to 1600 hops per second over 79 1-MHz channels or the entire ISM spectrum. Various error correcting schemes permit data packet protection by 1/3 and 2/3 rate forward error correction. In addition, Bluetooth uses retransmission of packets for improved reliability. These schemes help correct data errors but at the expense of bandwidth. Moreover, the retransmission method is not useful for voice calls due to the limited permissible delay. Finally, the existing Bluetooth protocol fails to exploit spatial diversity as developed for wideband code division multiple access (WCDMA) systems and disclosed by Dabak et al. in U.S. patent application Ser. No. 09/373,855, filed Aug. 13, 1999. These diversity techniques have proven effective for improved transmit range and reduced bit error rates and interference for WCDMA.

SUMMARY OF THE INVENTION

These problems are resolved by a communication circuit designed with a signal processing circuit arranged to produce a first plurality of data signals and receive a second plurality of data signals. A transmit circuit is coupled to receive the first plurality of data signals and transmit each data signal of the first plurality of data signals on a respective transmit frequency in a predetermined sequence of transmit frequencies. A receive circuit is coupled to receive each data signal of the second plurality of data signals from a remote transmitter on the respective transmit frequency in the predetermined sequence. The receive circuit applies the second plurality of data signals to the signal processing circuit.

The present invention improves reception by providing spatial diversity for the communication system. No additional transmit power or bandwidth is required. Power is balanced across multiple antennas.

BRIEF DESCRIPTION OF THE DRAWINGS

A more complete understanding of the invention may be gained by reading the subsequent detailed description with reference to the drawings wherein:

FIG. 3B is a block diagram of a slave communication circuit of FIG. 2 of the present invention;

FIG. 4A is a diagram showing the Bluetooth Modified Hopping sequence of the present invention for a single user on a synchronous call;

FIG. 4B is a diagram showing the Bluetooth Modified Hopping sequence of the present invention for more than one user on a synchronous call;

FIG. 6 is a diagram showing the Bluetooth Modified Hopping sequence of the present invention for a multiple users on an asynchronous call;

FIG. 9 is a tabular comparison of the signal-to-noise ratio for data of FIG. 8A-8D;

FIG. 10 is a tabular comparison of the increased range for cases of FIG. 8A-8D;

DETAILED DESCRIPTION OF THE PREFERRED EMBODIMENTS

Figure 1:
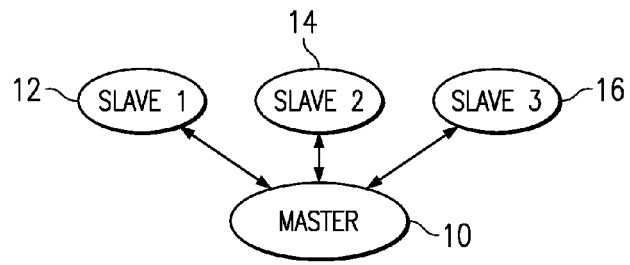
FIG. 1 is a block diagram of a typical piconet of the present invention.

Referring to FIG. 1, there is a block diagram of a typical piconet of the present invention. The piconet includes a master device 10 and slave devices 12-16. These devices communicate within the piconet using Bluetooth Modified Hopping (BMH) frequencies as will be described in detail. Spatial diversity within the piconet is accomplished by using preferably two antennas for transmit and receive operations at the master device and a single antenna at each slave device.

Figure 2:
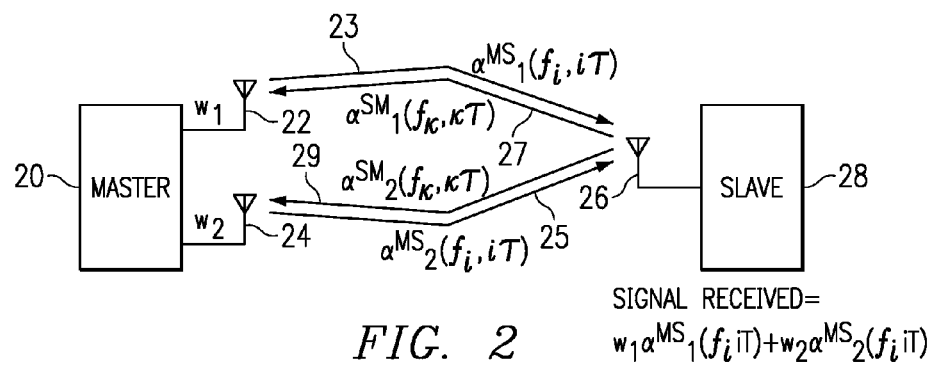
FIG. 2 is a block diagram showing signal flow within the piconet of FIG. 1 using transmit diversity and Bluetooth Modified Hopping sequences of the present invention.

The diagram of FIG. 2 illustrates signal flow within the piconet of FIG. 1 Slave device 28, connected to antenna 26, initiates a call to master device 20 by transmitting voice or data signals along paths 27 and 29 to remote antennas 22 and 24. These signals are subject to single path Rayleigh fading channel attenuation. The signals from the slave device 28 on paths 27 and 29, therefore, are effectively multiplied by respective Rayleigh fading coefficients $\alpha_1^{SM}(f_k,kT)$ and $\alpha_2^{SM}(f_k,kT)$ at respective antennas 22 and 24 of master device 20. Master device 20 measures the fading coefficients for each path and calculates respective weighting coefficients $w_1$ and $w_2$. Voice or data signals subsequently transmitted to slave device 28 by the master device 20 via antennas 22 and 24 are multiplied by these respective weighting coefficients $w_1$ and $w_2$ and transmitted along respective paths 23 and 25. Slave device 28 sums the received signals from paths 23 and 25 and decodes them to produce a received signal. Significant performance improvement is realized for communication between master device 20 and slave device 28 subject to the conditions of equations [1] and [2].

$$|iT - kT| << \frac{1}{\delta} \qquad [1]$$

$$|f_i - f_k| << \frac{1}{\sigma} \qquad [2]$$

Equation [1] requires that a difference between the master transmit time iT and slave transmit time kT be much less than an inverse of the Doppler frequency δ. This channel Doppler frequency δ typically corresponds to an indoor walking rate of about 3 Km/h or 6.5 Hz. Equation [2] requires that a difference between the master transmit frequency $f_i$ and slave transmit frequency $f_k$ be much less than an inverse of the channel delay spread σ. This channel delay spread σ is typically 50 ns for indoor communication, which is much less than the Bluetooth symbol width of 1 microsecond. A difference between both frequencies, however, must be satisfied with frequency hopping. Thus, both frequencies must be similar, as will be explained in detail, to achieve a high degree of correlation for master-to-slave and slave-to-master transmissions. Finally, a typical spacing between antennas 22 and 24 of one-half the transmit wavelength or 6.25 cm at 2.4 GHz is preferable to ensure full spatial diversity. Significant improvement may be achieved, however, for a smaller antenna spacing such as 4 cm.

Figure 3A:
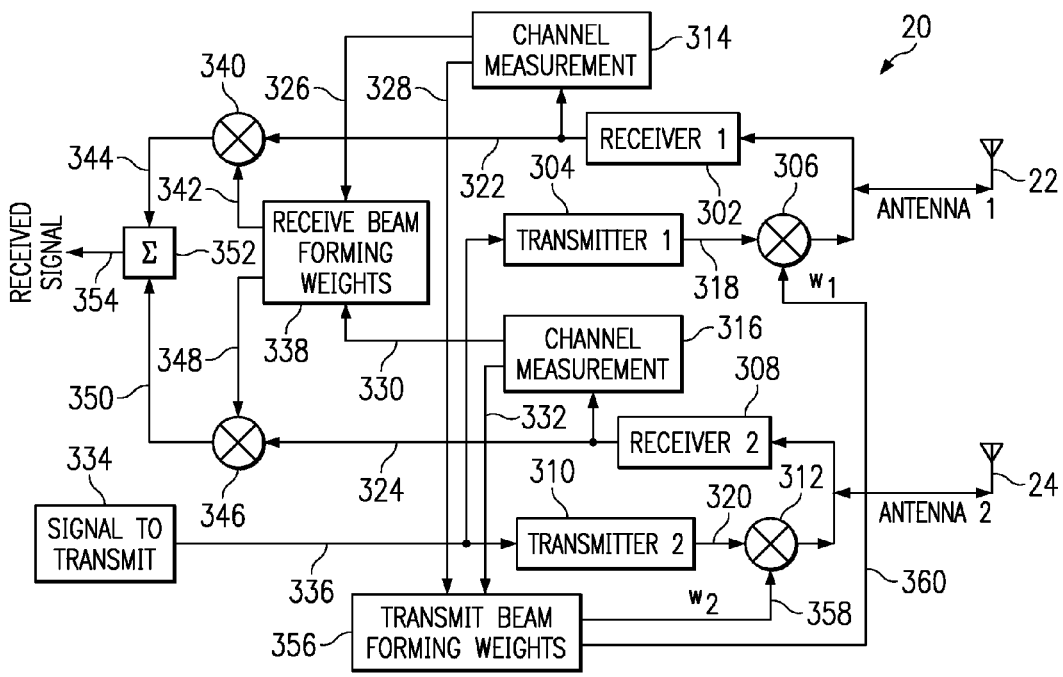
FIG. 3A is a block diagram of a master communication circuit of FIG. 2 of the present invention.

Turning now to FIG. 3A, there is a block diagram of a communication circuit of master device 20 as in FIG. 2 of the present invention. The circuit includes a channel measurement circuit 314, a receiver 302, a transmitter 304 and multiplication circuits 340 and 306 coupled to antenna 22 and corresponding elements coupled to antenna 24. Only the circuits corresponding to antenna 22, therefore, will be described in detail. Summation circuit 352, signal processing circuit 334 and transmit 356 and receive 338 weighting circuits correspond to both antennas.

In operation, a received signal at antenna 22 from slave device 28 is applied to receiver 302 and demodulated. The demodulated signal on lead 322 is measured by channel measurement circuit 314. The measured signal is applied to receive weighting circuit 338 via lead 326 together with a corresponding measured signal on lead 330 from antenna 24. The receive weighting circuit calculates receive weighting coefficients that are applied to leads 342 and 348, respectively. These calculated weighting coefficients favor the stronger of the received signals from antennas 22 and 24. The receive weighting coefficients are multiplied by circuits 340 and 346 with received signals on leads 322 and 324, respectively, to produce corrected signals on leads 344 and 350. These corrected signals are summed by circuit 352 to produce a received signal on lead 354.

The measured signals from channel measurement circuits 314 and 316 are also applied to transmit weighting circuit 356 via leads 328 and 332, respectively. Transmit weighting circuit 356 calculates and stores weighting coefficients $w_1$ and $w_2$. A subsequent transmission from the master device 20 is applied to transmit circuits 304 and 310 via lead 336 by signal processing circuit 334. Transmit circuits 304 and 310 preferably transmit on the same frequency as slave device 28 as will be explained in detail. Multiplication circuits 306 and 312 multiply signals on leads 318 and 320 by stored weighting coefficients $w_1$ and $w_2$, respectively. This method of adjusting transmit power for each antenna is beam forming for transmit (BFT). Signals from these multiplication circuits are applied to respective antennas 22 and 24 for transmission to slave device 28.

There are numerous methods of calculating weighting coefficients $w_1$ and $w_2$ that enhance transmission on one of the two antennas via a more favorable path. A first method of calculating weighting coefficients $w_1$ and $w_2$ is given by equations [3] and [4].

$$w_1 = \frac{\alpha_1^{SM}(f_i, iT)^*}{\sqrt{|\alpha_1^{SM}(f_i, iT)|^2 + |\alpha_2^{SM}(f_i, iT)|^2}} \quad [3]$$

$$w_2 = \frac{\alpha_2^{SM}(f_i, iT)^*}{\sqrt{|\alpha_1^{SM}(f_i, iT)|^2 + |\alpha_2^{SM}(f_i, iT)|^2}} \quad [4]$$

This method of BFT provides a transmit adaptive array (TxAA) wherein each weighting coefficient is a normalized complex conjugate (as indicated by the asterisk) of the Rayleigh fading coefficient for each respective antenna. Both antennas, therefore, transmit the same signal at a fraction of the total transmit power determined by the respective weighting coefficient. A second method of calculating the weighting coefficients is given by equations [5] and [6].

$$w_1=1, w_2=0; |\alpha_1^{SM}(f_i,iT)|>|\alpha_2^{SM}(f_i,iT)| \quad [5]$$

$$w_1=0, w_2=1; |\alpha_1^{SM}(f_i,iT)|<|\alpha_2^{SM}(f_i,iT)| \quad [6]$$

This method of BFT provides switched transmit diversity (STD) wherein one weighting coefficient is set to one and the other is set to zero based on the relative magnitudes of the Rayleigh fading coefficients for each respective antenna. Only one antenna, therefore, transmits the total transmit power for each transmission. Both TxAA and STD methods offer significant performance improvement over normal methods as will be discussed in detail.

Referring to FIG. 3B, there is a block diagram of a communication circuit of slave device 28 as in FIG. 2 of the present invention. The slave device 28 includes antenna 26 coupled to receiver 362 and transmitter 364. The receiver 362 and transmitter 364 are further coupled to signal processing circuit 370. In operation, the slave device receives a signal from the remote master device 20 on antenna 26. Receiver 362 demodulates the summed signal of the weighted multipath signals from transmit antennas 22 and 24. This signal is applied to signal processing circuit 370 via lead 366. The signal processing circuit produces the received signal on lead 372. A subsequent transmit signal on lead 372 is applied to transmitter 364. Transmitter 364 then transmits this signal at a new transmit frequency according to the normal Bluetooth hopping sequence via antenna 26.

Turning to FIG. 4A, there is a diagram showing the Bluetooth Modified Hopping sequence of the present invention for a single user on a synchronous call. Here, a synchronous call such as a voice call is similar to an established link between the master device M and the slave device $S_1$, wherein alternating transmissions continue until a call is terminated. By way of comparison, a normal Bluetooth frequency hopping pattern 40 is illustrated above. This normal hopping pattern utilizes a predetermined sequence of frequencies designated $f_1$-$f_{20}$ for each alternating transmission by a master device (M) and a slave device ($S_1$). This pattern has a disadvantage that any weighting coefficients calculated from a slave device $S_1$ transmission on one frequency, for example frequency $f_2$, would not closely correlate to subsequent transmissions by master device M on frequency $f_3$. This is because Rayleigh fading paths are greatly influenced by the frequency and time of transmission. The Bluetooth Modified Hopping (BMH) pattern 41 differs from the normal pattern in that a master device M always transmits on the same frequency as the immediately preceding slave device $S_1$ transmission. For example, a transmission 42 by slave device $S_1$ on frequency $f_2$ is used by master device M to calculate weighting coefficients $w_1$ and $w_2$ as previously described. These weighting coefficients are then applied to the next transmission on frequency $f_2$ by master device M. A subsequent transmission 43 by slave device $S_1$ on frequency $f_4$ is used by master device M to calculate a different set of weighting coefficients $w_1$ and $w_2$ corresponding to frequency $f_4$. The BMH pattern, therefore, is highly advantageous in providing close correlation of calculated weighting coefficients with Rayleigh path fading of master device transmissions.

The diagram of FIG. 4B illustrates the Bluetooth Modified Hopping (BMH) sequence of the present invention for multiple users on a synchronous call. In the normal hopping sequence 44, each master device M transmission is immediately followed by a transmission of either slave device $S_1$ or $S_2$ on the predetermined sequence of frequencies designated $f_1$-$f_{20}$. The BMH sequence 45 provides the same order of master and slave device transmissions as the normal hopping sequence. A master device M using the BMH pattern, however, transmits to each respective slave device $S_1$ or $S_2$ on the same frequency as the preceding transmission from that slave device. For example, a transmission 46 by slave device $S_1$ on frequency $f_2$ is used by master device M to calculate weighting coefficients $w_1$ and $w_2$. These weighting coefficients are then applied to the next transmission for slave device $S_2$ on frequency $f_2$ by master device M after two intervening time slots. Likewise, a transmission 43 by slave device $S_2$ on frequency $f_4$ is used by master device M to calculate a different set of weighting coefficients $w_1$ and $w_2$ corresponding to frequency $f_4$. Thus, the BMH pattern maintains the close correlation of calculated weighting coefficients with Rayleigh path fading of master device transmissions even with multiple users.

Figure 5A:
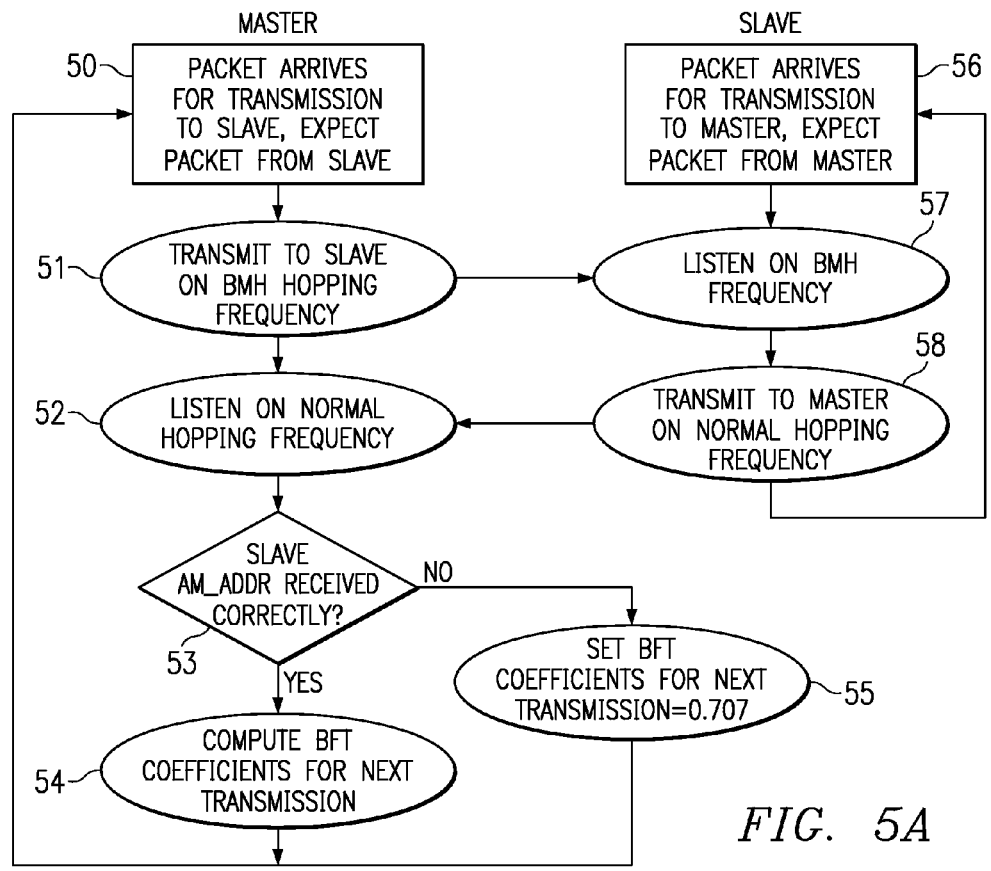
FIG. 5A is a flow chart showing Master and Slave operations for the Bluetooth Modified Hopping sequence of the present invention on a synchronous call.
Figure 5B:
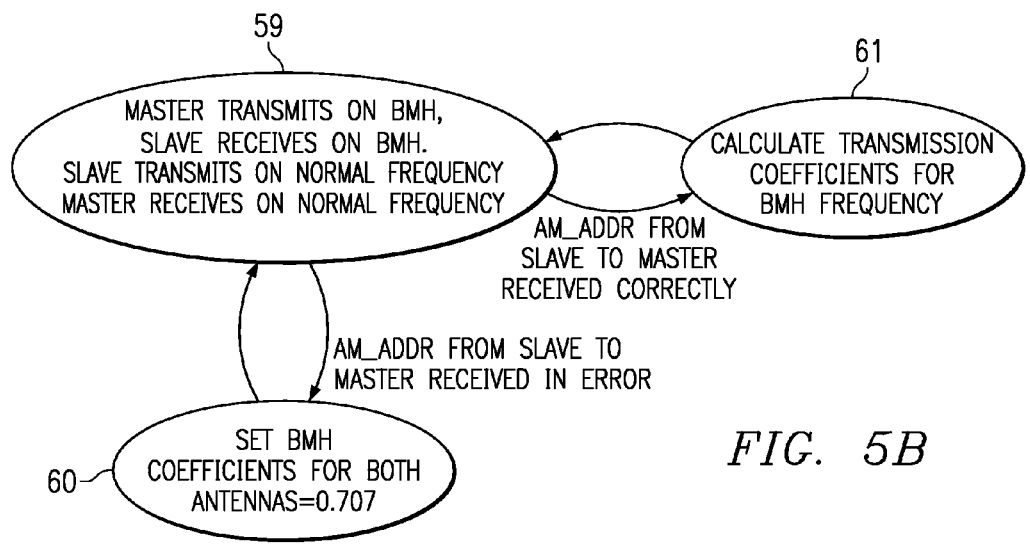
FIG. 5B is a state diagram corresponding to the flow chart of FIG. 5A.

Referring to FIG. 5A, there is a flow chart showing master and slave operations for the Bluetooth Modified Hopping sequence of the present invention on a synchronous call. The sequence of the flow chart will be explained in detail with reference to the state diagram of FIG. 5B. The flow chart includes both master and slave branches on the left and right, respectively. Each branch begins with reception of a data packet 50 and 52 for transmission to the opposite branch. The master branch then proceeds to step 51 and transmits to the slave branch at step 57. This and other steps of communicating between the master and slave devices is represented by state 59. Upon receiving the master device transmission at step 57, the slave device moves to step 58 and transmits to the master on the next predetermined hopping frequency of the normal sequence. The master device receives the slave transmission at step 53 and determines if the slave address AM_ADDR is received correctly. This AM_ADDR address is a 3-bit address that accompanies each transmission to identify one of up to seven active slave devices in the piconet corresponding to a respective time slot. If the slave address is correctly received during the proper time slot, the master device proceeds to step 54 or state 61 and calculates weighting coefficients $w_1$ and $w_2$. The master device then proceeds to step 50 and awaits the next data packet for transmission. If the slave device address is incorrect, however, the master device proceeds to step 55 or state 60. The master device then sets weighting coefficients $w_1$ and $w_2$ to a default value of 0.707, so the next transmission is equally weighted by each antenna. Furthermore, transmit power remains constant, since the root mean square (RMS) value of the weighting coefficients is one. Alternatively, the master device may set weighting coefficients $w_1$ and $w_2$ at step 55 or state 60 to previously determined values from the last correct slave device transmission.

The diagram of FIG. 6 illustrates the Bluetooth Modified Hopping sequence of the present invention for multiple users on an asynchronous call. An asynchronous call differs from a synchronous call in that no predictable link is established between the master and slave devices. Transmissions may be intermittent with single or multiple packet communication between the master and slave devices. The normal Bluetooth hopping sequence 62 includes the same predetermined sequence of frequencies designated $f_1$-$f_{20}$ as with synchronous calls. Each master device transmission is separated by an asynchronous slave transmission from an active slave device within the piconet. The BMH pattern 64 includes the same sequence of transmissions as the normal sequence. The master device transmit frequency for a designated slave device, however, is always the same as the immediately preceding transmit frequency of that designated slave device. The only exception to this occurs at timeout when the master device reverts to the normal Bluetooth hopping sequence as will be explained in detail. For example, a transmission 66 by slave device $S_1$ on frequency $f_2$ is used by master device M to calculate weighting coefficients $w_1$ and $w_2$ as previously described. These weighting coefficients are then applied to the next transmission for slave device $S_2$ on frequency $f_2$ by master device M after two intervening time slots. A transmission 68 by slave device $S_2$ on frequency $f_4$ is used by master device M to calculate a different set of weighting coefficients $w_1$ and $w_2$ corresponding to frequency $f_4$. The master device responds to slave device $S_2$ on frequency $f_4$ after eight intervening time slots. Thus, the BMH pattern maintains the close correlation of calculated weighting coefficients with Rayleigh path fading of master device transmissions even with multiple users and asynchronous transmission.

Figure 7A:
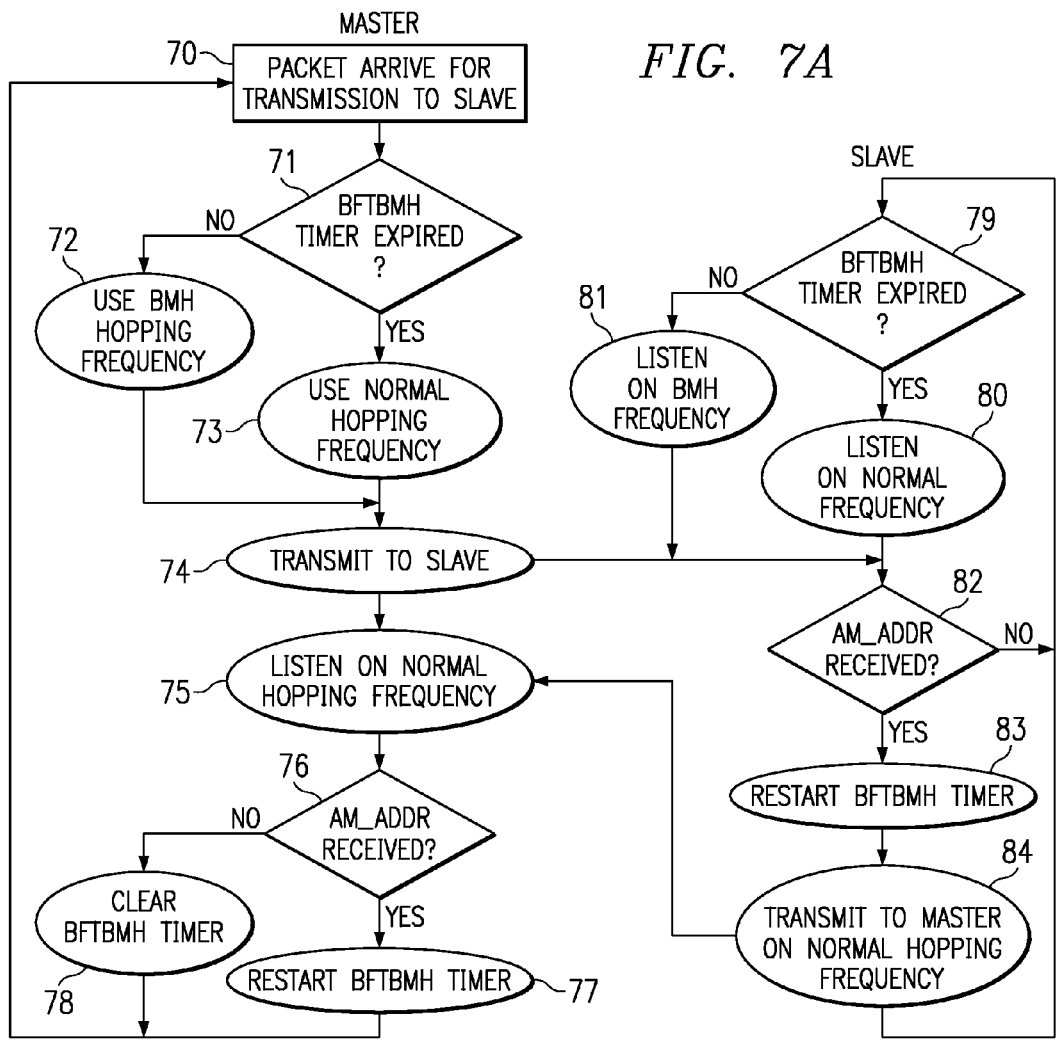
FIG. 7A is a flow chart showing Master and Slave operations for the Bluetooth Modified Hopping sequence of the present invention on an asynchronous call.

Referring to FIG. 7A, there is a flow chart showing Master and Slave operations for the Bluetooth Modified Hopping sequence of the present invention on an asynchronous call. The sequence of the flow chart will be explained in detail with reference to the state diagram of FIG. 7B. The state diagram includes states 85, 86 and 87, representing a communication system between master and slave devices. These states are determined by the condition of a master timer $T_M$ and a slave timer $T_S$. These timers keep track of the individual packet times of FIG. 6, thereby keeping master and slave devices in synchronization. State 86 corresponds to communication between master and slave devices similar to the synchronous case where both a master timer $T_M$ and a slave timer $T_S$ are both operating in synchronization at time T. This time T is an initial count determined by the master device. It is typically at least $1/\lambda$ and preferably $3/\lambda$, where $\lambda$ is the packet arrival rate. State 85 corresponds to a condition where neither the master timer $T_M$ nor the slave timer $T_S$ have started and the communication system defaults to the normal Bluetooth frequency hopping sequence. State 87 is a special case where the master timer $T_M$ has not started and has a value of zero, but the slave timer $T_S$ has started and has a value T. A transition between states is governed by probabilities of TABLE I and is modeled as a Poisson process determined by the packet arrival rate of $\lambda$ packets/second.

Figure 7B:
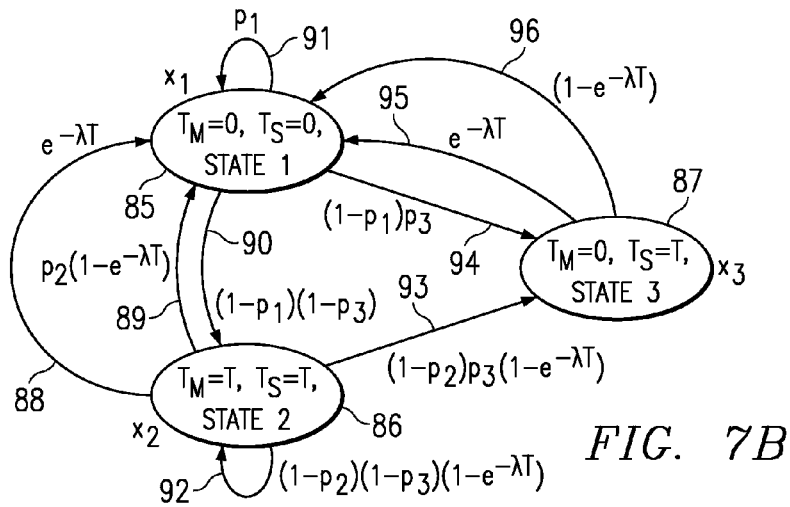
FIG. 7B is a state diagram corresponding to the flow chart of FIG. 7A.

TABLE I $p_1$ = probability AM_ADDR from Master to Slave is received in error with no BFT
$p_2$ = probability AM_ADDR from Master to Slave is received in error with BFT
$p_3$ = probability AM_ADDR from Slave to Master is received in error with two antennas
$x_1$ = probability system is in state 85
$x_2$ = probability system is in state 86
$x_3$ = probability system is in state 87
$t_1 = 1/\lambda$ average time spent in state 85
$t_2 = T$ average time spent in state 86
$t_3 = (1 - e^{-\lambda T})/\lambda$ average time spent in state 87
$e^{-\lambda T}$ = probability no packet received in time T The flow chart includes both master and slave branches on the left and right, respectively. State 86 represents normal operation of the communication system using the BMH sequence. From state 86 when both master and slave timers are running for time T, the master branch begins with the step of reception of a data packet 70 for transmission to the slave branch. The master branch then proceeds to step 71 to determine if the BFTBMH timer is running. Since both timers are running in state 86, the master proceeds to step 72 and uses the BMH sequence to transmit to the slave at step 74. In this case, the BMH sequence is the previous transmit frequency of the slave. If the slave correctly receives the address AM_ADDR at step 82, it restarts the timer at step 83 and transmits to the master on the normal Bluetooth hopping frequency at step 84. The master receives the slave transmission at step 75 and determines if the correct address AM_ADDR is received at step 76. If the correct address is received, the master restarts its BFTBMH timer at step 77 and proceeds to step 70 for transmission of the next data packet. This sequence of steps corresponds to self-loop 92 (FIG. 7B). Referring to Table I, this self-loop 92 continues and the communication system remains in state 86 subject to the product of probabilities that addresses AM_ADDR from master to slave $(1-p_2)$ and from slave to master $(1-p_3)$ are correctly received and that a data packet is received during time T with a probability of $(1-e^{-\lambda T})$.

A transition from state 86 to state 87 is possible along path 93 if address AM_ADDR from slave to master is incorrectly received ($p_3$). This corresponds to a branch from step 76 to step 78 by the master. The master will clear the BFTBMH timer and return to step 70 for next packet transmission. The master determines at step 71 that the BFTBMH timer has expired and uses a normal hopping sequence for the next transmission at step 74. The slave, however, will not receive an AM_ADDR from the master and will loop through steps 82, 79 and 81 until the BFTBMH timer is expired. Thus, the communication system will move from state 87 to state 85 with a probability of 1 corresponding to paths 95 and 96. Moreover, the communication system will remain in state 85 on self-loop 91 as long as address AM_ADDR from master to slave is received in error ($p_1$). This results in normal operation of the communication system using the normal Bluetooth hopping sequence. Alternatively, if the address AM_ADDR from master to slave is correctly received ($1-p_2$), but the address AM_ADDR from slave to master is incorrectly received ($p_3$), the communication system will loop to state 87 and back to state 91. Only correctly received addresses AM_ADDR from master to slave ($1-p_1$), and from slave to master ($1-p_3$), therefore, will move the communication system from state 85 to state 86.

If the communication system is operating in state 86 with beam forming transmission BFT), address AM_ADDR from master to slave is incorrectly received ($p_2$), and a data packet is received during time T with a probability of ($1-e^{-\lambda T}$), the system will move via path 89 to state 85 when both BFTBMH timers expire. Alternatively, if a data packet is not received during time T with a probability of ($e^{-\lambda T}$), the communication system will move from state 86 to state 85 via path 88. This communication system is highly advantageous in providing for both normal and modified 10 (BMH) sequences. This ensures compatibility between BFTBMH devices and normal Bluetooth devices within the same piconet. Moreover, when both master and slave devices are BFTBMH compatible, the communication system benefits from improved reception.

Figure 8A:
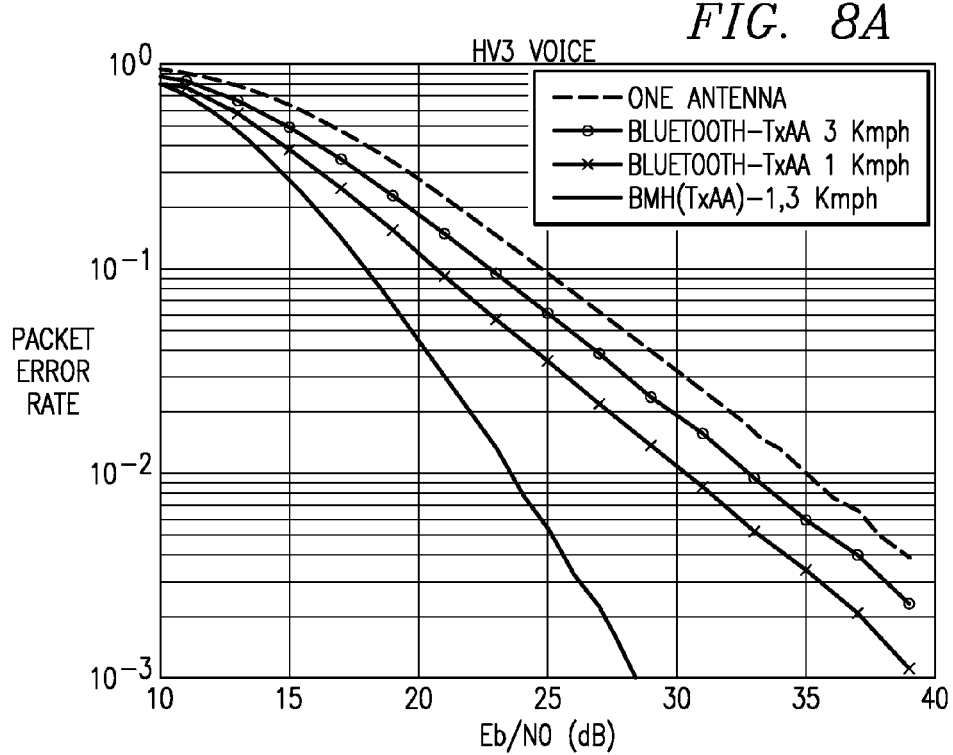
FIG. 8A is a simulation showing packet error rate as a function of the bit energy-to-noise ratio for HV3 voice packet transmission with TxAA compensation.
Figure 8B:
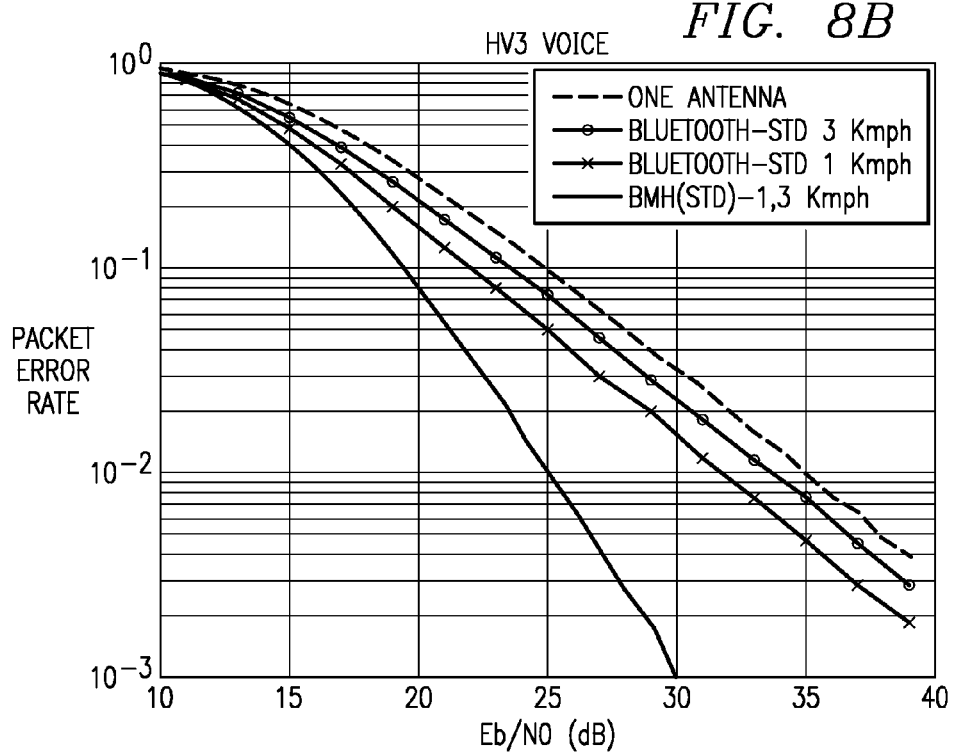
FIG. 8B is a simulation showing packet error rate as a function of the bit energy-to-noise ratio for HV3 voice packet transmission with STD compensation.
Figure 8C:
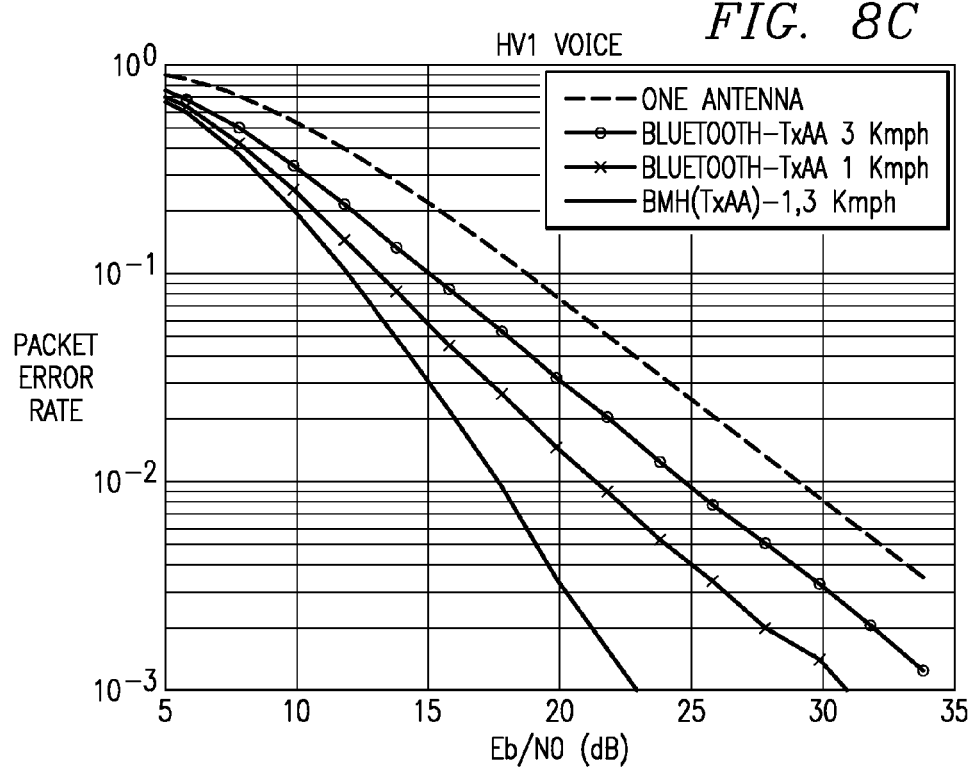
FIG. 8C is a simulation showing packet error rate as a function of the bit energy-to-noise ratio for HV1 voice packet transmission with TxAA compensation.
Figure 8D:
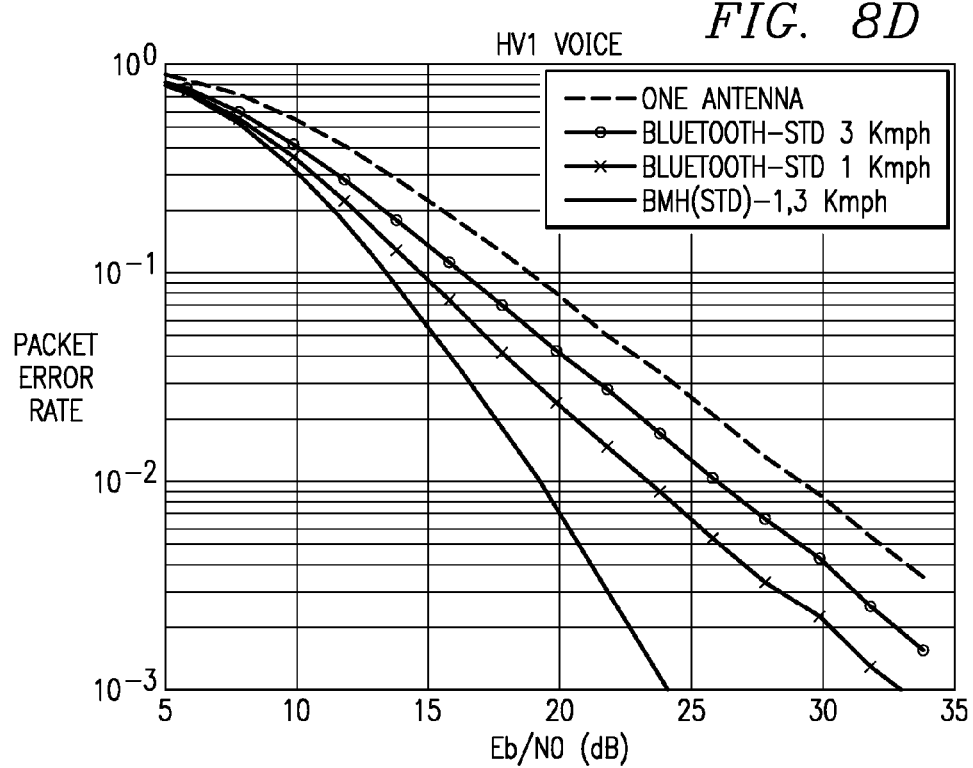
FIG. 8D is a simulation showing packet error rate as a function of the bit energy-to-noise ratio for HV1 voice packet transmission with STD compensation.

Referring now to FIGS. 8A and 8B, there are simulations showing packet error rate as a function of the signal-to-noise (SNR) or bit energy-to-noise (Eb/N0) ratio for HV3 voice packet transmission with TxAA compensation and STD compensation, respectively. The term HV3 means High-quality Voice transmission for three active slave devices. Since a master device transmission follows each of the slave device transmissions, each slave device transmits an HV3 packet every sixth time slot. Likewise, HV1 implies only one active slave device with an HV1 packet transmission every second time slot. The upper curve in each case shows the packet error rate for single antenna transmission. By way of comparison, TxAA compensation for slave device movement with respect to the master device of 3 Km/h and 1 Km/h, respectively, are shown in the next curves. Finally, the lower solid curve indicates packet error rate for TxAA with BMH. Comparable simulation results are given at FIGS. 8C and 8D, respectively, for HV1 voice packet transmission. The signal-to-noise ratio (SNR) gain with respect to a single antenna is tabulated for the purpose of comparison at FIG. 9 for an exemplary $10^{-2}$ packet error rate. For example, the SNR for a HV3 voice packet transmitted by one antenna is 35 dB for a $10^{-2}$ packet error rate. The SNR for the same HV3 voice packet with BMH and TxAA BFT compensation (FIG. 8A) is 23.4 dB for a gain of 11.6 dB. The corresponding SNR for the same HV3 voice packet with BMH and STD BFT compensation (FIG. 8B) is 25 dB for a gain of 10 dB. The SNR gain of FIG. 9 corresponds to an increase in transmission range r for the same conditions in FIG. 10. For example, assuming an $r^3$ propagation loss, the 11.6 dB SNR gain with BMH and TxAA BFT compensation results in a range increase by a factor of 2.4 over single antenna transmission. Likewise, the 10 dB SNR gain with BMH and STD BFT compensation results in a range increase by a factor of 2.2 over single antenna transmission.

Figure 11:
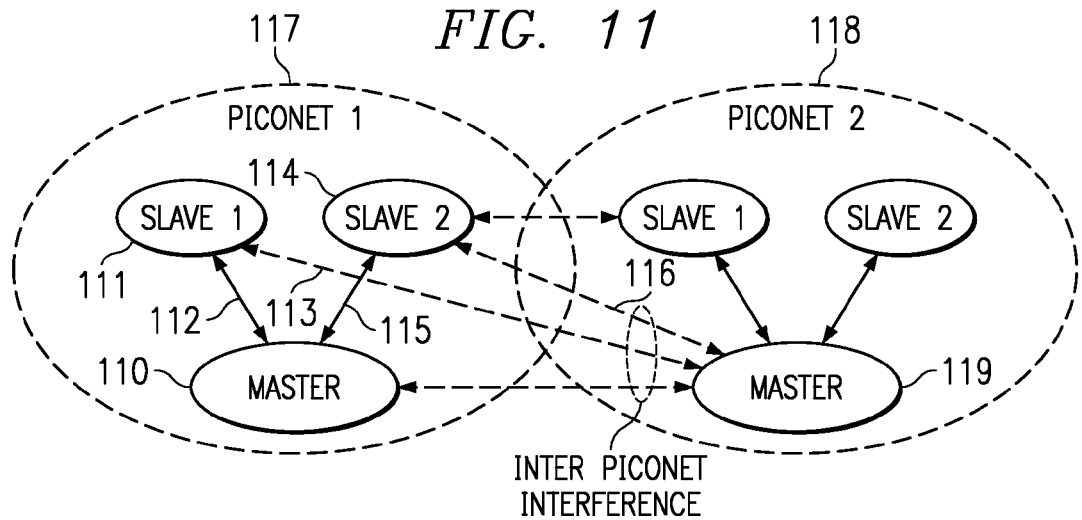
FIG. 11 is a diagram illustrating co-channel interference between piconets.
Figure 12:
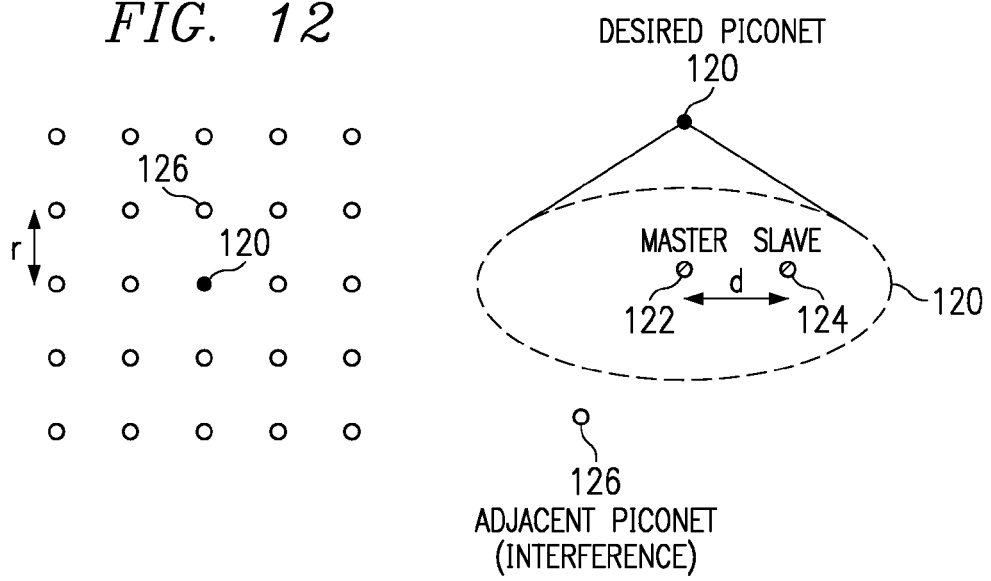
FIG. 12 is a diagram illustrating a rectangular grid of Bluetooth piconets.
Figures 13A, 13B:
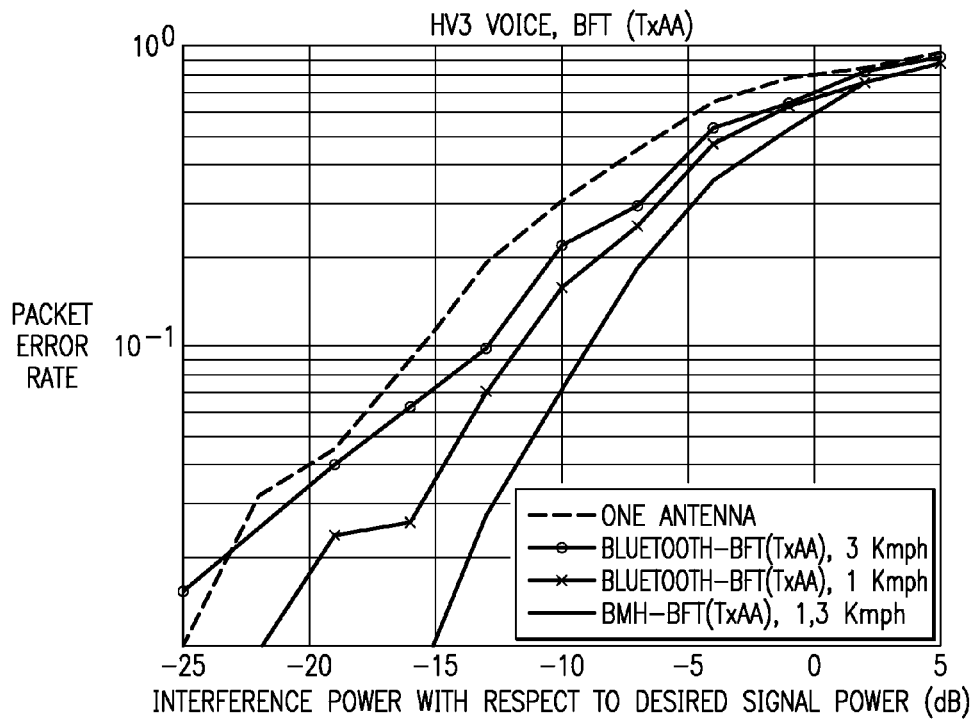
FIG. 13A is a simulation of packet error rate as a function of a ratio of interference power to signal power for transmit adaptive array (TxAA) compensation.
FIG. 13B is a tabular comparison of single antenna transmission to Bluetooth Modified Hopping for the simulation of FIG. 13A of the present invention for a 10 m×10 m grid.

A particular problem of co-channel interference arises when closely spaced piconets are employed for wire or cable replacement. The problem is illustrated by FIG. 11. A first piconet 117 is employed in close proximity to a second piconet 118. The problem arises, for example, when transmission from master device 110 to slave device 114 along path 115 receives co-channel interference from master device 119 along path 116. Turning to FIG. 12, an array of piconets is modeled as a rectangular grid having a spacing r from a nearest piconet in the grid. Thus, piconet 120 is a distance r from piconet 126. Each piconet, for example piconet 120, includes a master device 122 and a slave device 124 separated by a distance d. Additionally, FIG. 13A is a simulation of packet error rate as a function of a ratio of interference power to signal power. The upper curve shows the error rate for one antenna. The lower curve shows the error rate for BFTBMH with TxAA compensation. Path loss for the grid of piconets is modeled by equation [7] for r<=8 m and by equation [8] for r>8 m.

$$\text{Loss}=20 \log(4\pi r/\lambda) \qquad [7]$$

$$\text{Loss}=58.3+33 \log(r/8) \qquad [8]$$

Equations [7] and [8] together with the simulation results of FIG. 13A yield the tabulated results of FIG. 13B. These results show the maximum number active of piconets that will operate in a 10 m square grid as in FIG. 12 as a function of spacing d between the master and slave device. Single antenna transmission at a packet error rate (PER) of 1% and a distance of 1 m between master and slave devices will accommodate 2 piconets in the 10 m×10 m area. The two antenna BFTBMH system with TxAA compensation for the same PER and separation d, however, will accommodate 12 piconets in the same area. Thus, improved communication of the present invention with TxAA compensation results in an increase in piconet density by a factor of 6.

Figures 14A, 14B:
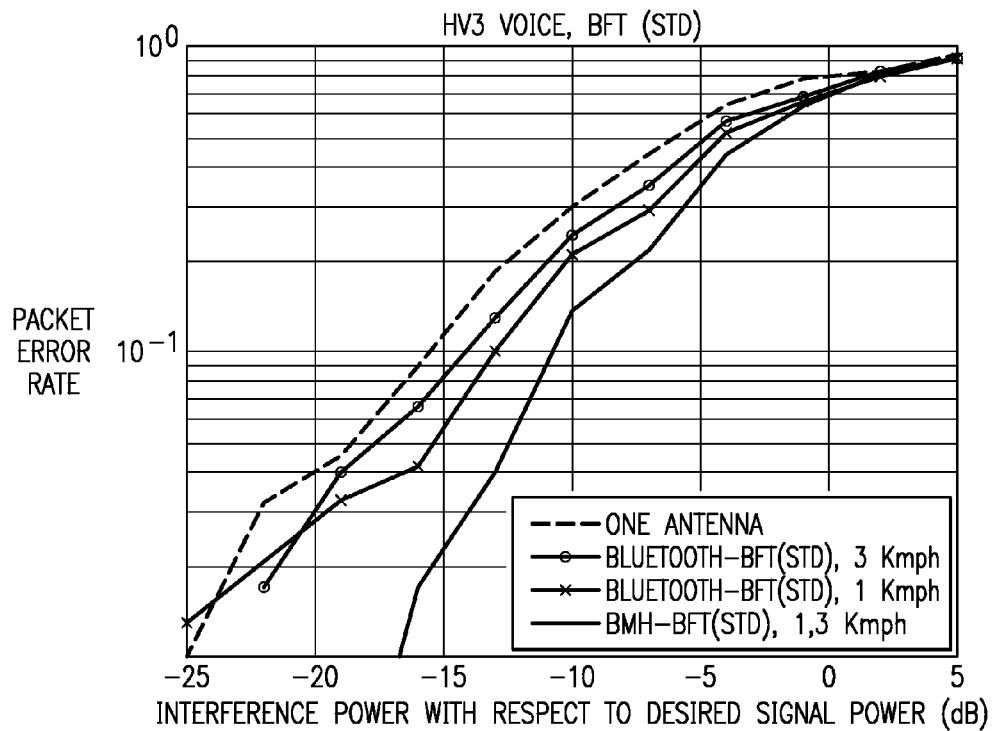
FIG. 14A is a simulation of packet error rate as a function of a ratio of interference power to signal power for switched transmit diversity (STD) compensation.
FIG. 14B is a tabular comparison of single antenna transmission to Bluetooth Modified Hopping for the simulation of FIG. 14A of the present invention for a 10 m×10 m grid.

The simulation of FIG. 14A shows the packet error rate as a function of a ratio of interference power to signal power for STD compensation. The upper curve shows the error rate for one antenna. The lower curve shows the error rate for BFT-BMH with STD compensation. The simulation results of FIG. 14A are tabulated at FIG. 14B. These results show a maximum of 8.5 active of piconets will operate in the 10 m square grid of the previous example with a packet error rate (PER) of 1% and a distance of 1 m between master and slave devices. Thus, improved communication of the present invention with STD compensation results in an increase in piconet density by a factor of greater than 4.

Figure 15:
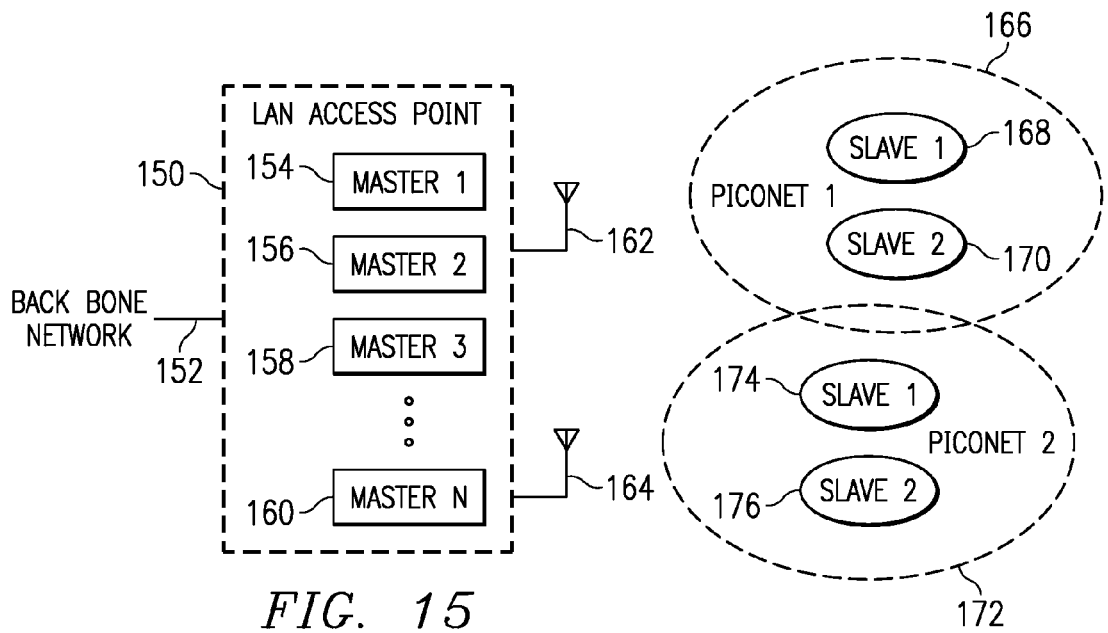
FIG. 15 is a diagram illustrating communication between multiple piconets and a LAN access point.

Referring to FIG. 15, there is a diagram illustrating communication between multiple piconets and a LAN access point. The LAN access point 150 includes master devices 154-160. These master devices are synchronized with each other to operate over aligned time slots. This time slot alignment permits connection of all master devices to common antennas 162 and 164. The master devices, for example 154 and 156, correspond to respective slave device piconets such as piconets 166 and 172, respectively. Thus, a further advantage of the present invention is the elimination of a need for separate antennas for each master device.

Figure 16A:
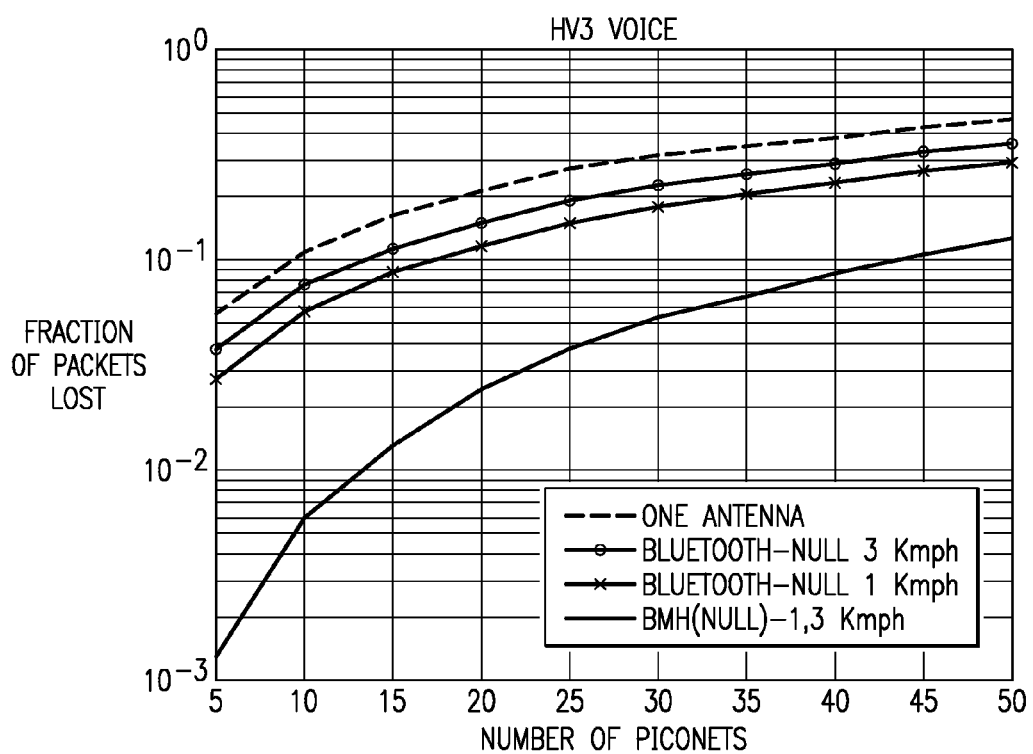
FIG. 16A is a simulation showing a fraction of HV3 packets lost as a function of the number of supported piconets.
Figures 16B, 16C:
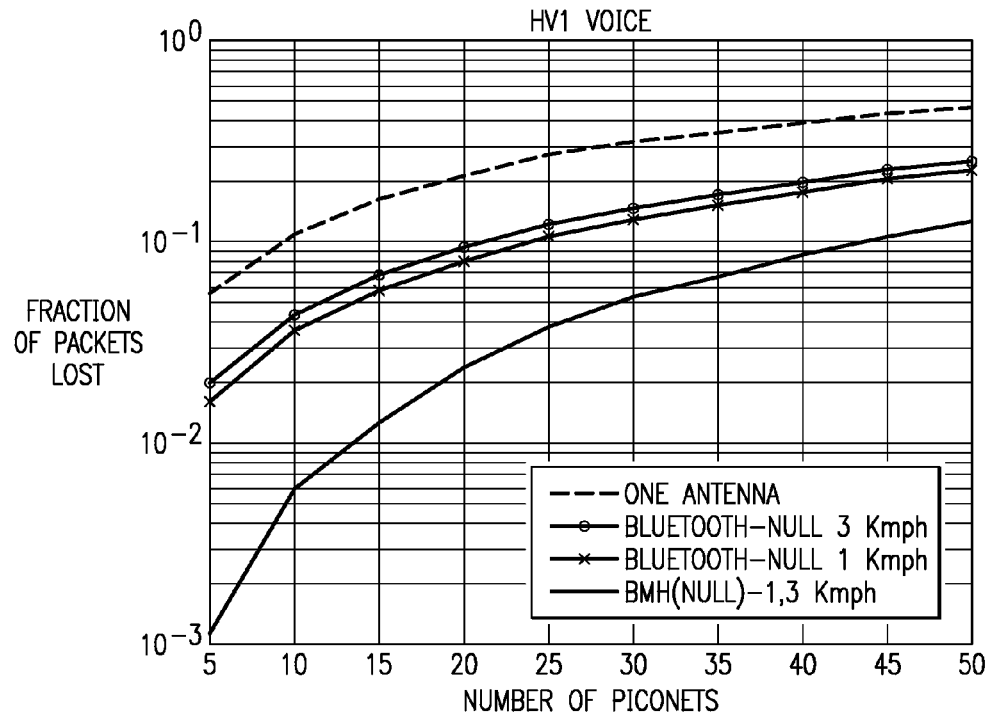
FIG. 16B is a simulation showing a fraction of HV1 packets lost as a function of the number of supported piconets.
FIG. 16C is a tabular comparison of the simulations of FIG. 16A and FIG. 16B.

The LAN access point coordinates master device participation in each piconet and has access to each piconet hopping pattern. Collisions for single antenna transmission, however, limit the communication rate between the LAN access point and corresponding piconets. The simulation of FIG. 16A shows the fraction of packets lost for HV3 voice packets as a function of the number of supported piconets due to these collisions. The simulation of FIG. 16B shows comparable results for HV1 voice packets. Referring to the tabulated data of FIG. 16C, for single antenna transmission, 9 piconets connected to the LAN access point produce about 10% packet loss due to these collisions. The BFT null transmission, as will be explained in detail, for normal Bluetooth hopping frequencies at 3 Kmph movement of the slave device with respect to the master device improves density to 13 at piconets 10% packet loss. The density further improves for BFT null transmission and normal Bluetooth hopping frequencies at 1 Kmph to 16 at piconets 10% packet loss. Finally, BFTBMH null of the present invention accommodates 43 piconets at the same 10% packet error rate. Thus, a significant improvement in capacity by a factor of greater than four is realized by the present invention.

An advantage of the present invention includes the ability to transmit or receive between the LAN access point and slave devices in different piconets at the same time on the same frequency. The LAN access point has stored current Rayleigh fading coefficients for each slave device with BMH. Thus, the LAN access point selects weighting coefficients for transmission to the slave device in a first piconet that are orthogonal to the slave device in a second piconet. Likewise, the LAN access point selects weighting coefficients for transmission to the slave device in the second piconet that are orthogonal to the slave device in the first piconet. The resulting signals after multiplication by respective weighting coefficients are added and the net signal is transmitted over antennas 162 and 164. The slave devices in the first and second piconets do not receive any interference from the net signal, because the orthogonal weighting coefficients produce a null at the unintended slave device. This BFT null precludes interference unless at least three slave device transmissions occur at the same time on the same frequency. Thus, a substantial improvement in throughput is achieved between the LAN access point and corresponding piconets.

Figure 17A:
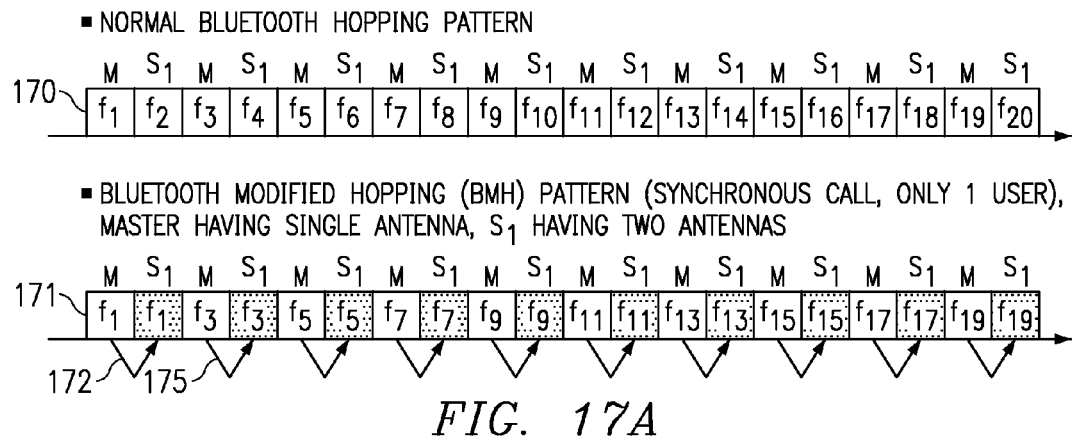
FIG. 17A is a diagram of another embodiment of the present invention showing the Bluetooth Modified Hopping sequence of the present invention for a single user on a synchronous call.
Figure 17B:
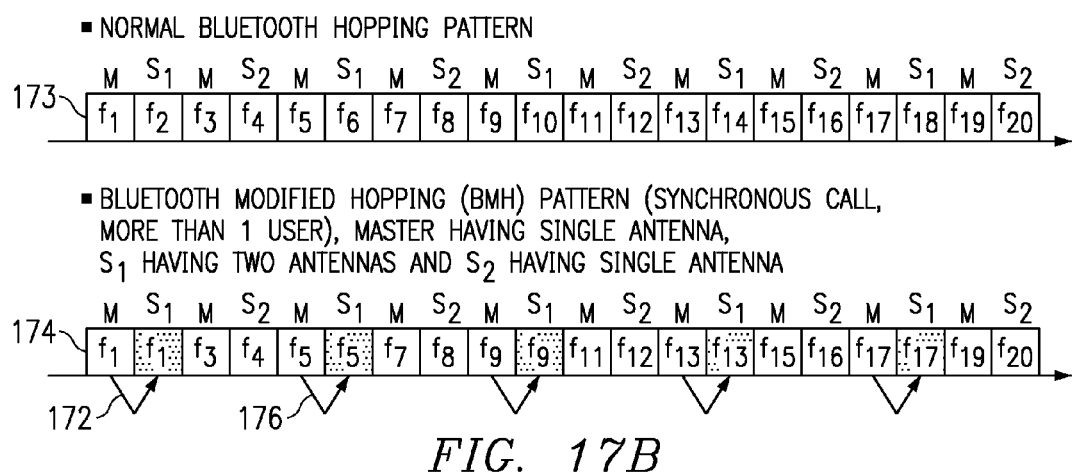
FIG. 17B is a diagram of another embodiment of the present invention showing the Bluetooth Modified Hopping sequence of the present invention for more than one user on a synchronous call.
Figure 17C:
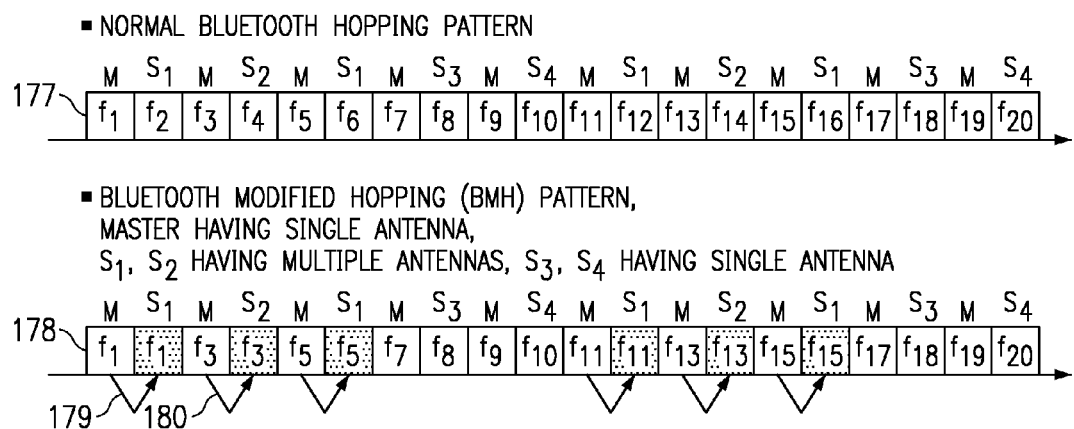
FIG. 17C is a diagram of another embodiment of the present invention showing the Bluetooth Modified Hopping sequence of the present invention for a multiple users on an asynchronous call.

Although the invention has been described in detail with reference to its preferred embodiment, it is to be understood that this description is by way of example only and is not to be construed in a limiting sense. For example, the multiplier circuits 306 and 312 Furthermore, the exemplary diversity of the present invention may be increased with a greater number of transmit or receive antennas. Moreover, although previous embodiments of the present invention envision plural diversity antennas for the master device and a single antenna for the slave device, the diversity antennas may be located at the slave device and a single antenna at the master device. The frequency hopping patterns previously described for FIG. 4A, FIG. 4B and FIG. 6 master device diversity antennas correspond respectively to frequency hopping patterns of FIG. 17A-17C for diversity antennas at the slave device and a single antenna at the master device. A major difference in this frequency hopping pattern is that the master device uses the normal Bluetooth frequency hopping pattern. The receiving slave device subsequently transmits on the same frequency. Thus, the frequency hopping roles of the master device and slave device are reversed when the slave device employs diversity antennas. Furthermore, novel concepts of the present invention are not limited to exemplary circuitry, but may also be realized by digital signal processing as will be appreciated by those of ordinary skill in the art with access to the instant specification.

It is to be further understood that numerous changes in the details of the embodiments of the invention will be apparent to persons of ordinary skill in the art having reference to this description. It is contemplated that such changes and additional embodiments are within the spirit and true scope of the invention as claimed below.

What is claimed:

1. A method of communicating with a remote communication circuit, comprising the steps of:
    transmitting a first plurality of data signals to the remote communication circuit on a first sequence of respective frequencies, the first plurality of signals including an identification signal;
    receiving a second plurality of data signals having a first weight from the remote communication circuit on the first sequence of respective frequencies in response to a first state of the identification signal; and
    receiving the second plurality of data signals having a second weight from the remote communication circuit on the first sequence of respective frequencies in response to a second state of the identification signal.

2. A method as in claim 1, wherein the remote communication circuit transmits the second plurality of data signals from a plurality of antennas.

3. A method as in claim 2, wherein each data signal of the second plurality of data signals is multiplied by a weighting coefficient corresponding to a respective antenna of the plurality of antennas, and wherein each said weighting coefficient has a value corresponding to a received signal strength at the respective antenna.

4. A method as in claim 2, wherein each data signal of the second plurality of data signals is multiplied by a weighting coefficient corresponding to a respective antenna of the plurality of antennas, and wherein a first weighting coefficient corresponding to a first antenna of the plurality of antennas has a value of one, and a second weighting coefficient corresponding to a second antenna of the plurality of antennas has a value of zero.

5. A method as in claim 1, wherein the remote communication circuit forms a piconet with ax least another communication circuit.

6. A method as in claim 1, wherein the identification signal identifies at least one communication circuit 7. A method of communicating with a remote communication circuit, comprising the steps of:
    transmitting a first plurality of data signals to the remote communication circuit on a first sequence of respective frequencies, the first plurality of data signals including an identification signal;
    producing a first control signal in response to receiving the identification signal within a predetermined time;
    producing a second control signal in response to not receiving the identification signal within the predetermined time; and
    receiving a second plurality of data signals from the remote communication circuit on the first sequence of respective frequencies.

8. A method as in claim 7, further comprising the steps of:
    receiving the second plurality of data signals from the remote communication circuit on a first sequence of respective frequencies in response to the first control signal; and
    receiving the second plurality of data signals from the remote communication circuit on a second sequence of respective frequencies different from the first sequence in response to the second control signal.

9. A method as in claim 1, wherein the remote communication circuit is a master device and wherein a slave device receives the second plurality of data signals.

10. A method as in claim 1, wherein the second plurality of data signals is produced by one of a cordless phone base station, a local area network access point, a computer, and a bridge to other networks.

11. A method as in claim 1, wherein the first plurality of data signals is produced by one of a cordless phone handset, a cell phone, a personal digital assistant, a digital camera, and a computer peripheral.

12. A method as in claim 11, wherein the computer peripheral is one of a printer, a scanner, a fax machine, and another computer.

13. A method of communicating with a remote communication circuit, comprising the steps of:
- receiving a first data signal from a plurality of antennas on a respective frequency of a frequency hopping pattern;
- selecting a first frequency hopping pattern prior to a predetermined time;
- selecting a second frequency hopping pattern after the predetermined time;
- calculating a respective weighting coefficient corresponding to each antenna of the plurality of antennas;
- multiplying a second data signal by the respective weighting coefficient of said each antenna, thereby producing a respective second weighted data signal corresponding to said each antenna; and
- transmitting each said respective second weighted data signal at the corresponding said each antenna of the plurality of antennas on one of the first and second frequency hopping patterns to the remote communication circuit in response to the predetermined time.

14. A method as in claim 13, wherein the plurality of antennas are spaced apart by at least 2 centimeters and by no more then 15 centimeters.

15. A method as in claim 14, wherein the plurality of antennas consists of two antennas.

16. A method as in claim 13, wherein the remote communication circuit is arranged to form a piconet with at least another communication circuit.

17. A communication circuit as in claim 16, wherein the remote communication circuit is a slave device.

18. A method as in claim 13, wherein the first data signal includes an identification signal that identifies the remote communication circuit.

19. A method as in claim 13, wherein the remote communication circuit is one of a cordless phone handset, a cell phone, a personal digital assistant, a digital camera, and a computer peripheral.

20. A method as in claim 19, wherein the computer peripheral is one of a printer, a scanner, a fax machine, and another computer.

21. A method as in claim 13, wherein the second data signal is produced by one of a cordless phone base station, a local area network access point, a computer, and a bridge to other networks.

22. A method as in claim 13, further comprising the steps of:
- multiplying the first data signal by the respective weighting coefficient of said each antenna, thereby producing a respective first weighted data signal corresponding to said each antenna; and
- summing each said respective first weighted data signal corresponding to said each antenna, thereby producing a received signal.

23. A method as in claim 13, wherein the step of calculating comprises setting each said respective weighting coefficient corresponding to each antenna of the plurality of antennas to a value proportional to a value of the first data signal from said each antenna.

24. A method as in claim 13, wherein the step of calculating comprises setting a first said respective weighting coefficient corresponding to a first antenna of the plurality of antennas to a value of one and setting a second said respective weighting coefficient corresponding to a second antenna of the plurality of antennas to a value of zero in response to the first data signal from the first antenna having a greater value than the first data signal from the second antenna.

* * * * *